United States Patent [19]

Rach et al.

[11] Patent Number: 4,790,892

[45] Date of Patent: Dec. 13, 1988

[54] METHOD OF PRODUCING A PNEUAMTIC VEHICLE TIRE

[75] Inventors: Heinz-Dieter Rach, Garbsen; Udo Frerichs, Langenhagen; Hans-Ulrich Klose, Wiedensahl; Carsten Boltze, Wennigsen, all of Fed. Rep. of Germany

[73] Assignee: Continental Aktiengesellschaft, Hanover, Fed. Rep. of Germany

[21] Appl. No.: 836,398

[22] Filed: Mar. 5, 1986

[30] Foreign Application Priority Data

Mar. 5, 1985 [DE] Fed. Rep. of Germany ....... 3507705

[51] Int. Cl.⁴ ............................................. B29D 30/08
[52] U.S. Cl. ................................... 156/130.7; 152/544; 152/548; 156/131; 156/133; 156/135; 156/228; 156/289; 156/398; 264/236; 264/339
[58] Field of Search ............... 152/544, 552, 553, 548, 152/540, 539, 454, 510, 380, 379.3, DIG. 20; 156/130.7, 133, 134, 398, 124, 126, 127, 128.1, 128.6, 129, 130.5, 131, 132, 135, 214, 215, 221, 228, 289; 264/336, 339, 347, 236; 425/36, 49, 51, 52, 58

[56] References Cited

U.S. PATENT DOCUMENTS 1,885,484 11/1932 Shoemaker ...................... 152/379.3
4,577,668 3/1986 Seitz et al. ...................... 152/380 X

FOREIGN PATENT DOCUMENTS 3000428 7/1981 Fed. Rep. of Germany ... 152/DIG. 20

Primary Examiner—Michael W. Ball
Assistant Examiner—Thomas Bokan
Attorney, Agent, or Firm—Becker & Becker, Inc.

[57] ABSTRACT

A method of producing a pneumatic vehicle tire, the beads of which can be mounted on the radially inner periphery of a rim, and are pivotably relative to the bead cores. A carcass along with the adjacent rubber layers, and the tire beads, with their pull and compression resistant cores, are combined on a drum to form an essentially cylindrical blank. What will later be the insides of the tire initially face radially outwardly, and the interfaces of the initially radially outwardly extending beads form an essentially right angle with the cylindrical surface of the blank. At least the bead regions of the tire blank are preliminarily vulcanized, whereupon the blank is turned in and has imparted thereto a toroidal shape. The blank is then provided with a tread strip, and is final-vulcanized.

6 Claims, 2 Drawing Sheets

METHOD OF PRODUCING A PNEUAMTIC VEHICLE TIRE

BACKGROUND OF THE INVENTION

1. Field of the Invention

The present invention relates to a method of producing a pneumatic vehicle tire, the beads of which can be mounted on the radially inner periphery of a rim, and are pivotable.

2. Description of the Prior Art

Vehicle wheels provided with such pneumatic vehicle tires are known. Such arrangements are particularly suitable for a so-called emergency operation, with the pneumatic vehicle tires being superior to conventional tires with regard to nearly all driving characteristics. Such a vehicle wheel is described, for example, in German Offenlegungsschrift No. 30 00 428 Rach et al dated Mar. 29, 1984 and belonging to the assignee of the present invention. With this vehicle wheel, the sealing surfaces of the tire, i.e. those surfaces which seal the tire in an airtight manner relative to the rim, are located in the radially outer region of the bead zone, in other words, in the interior of the tire. However, this produces considerable manufacturing problems compared with conventional tires because it is extremely difficult to produce smooth surfaces at the aforementioned locations during the build-up and vulcanization of the tire.

To resolve this problem, German Offenlegungsschrift No. 32 46 624 Frerichs et al dated June 20, 1984 and belonging to the assignee of the present invention proposed vulcanizing the tire blank in a so-called trapezoidal position, i.e. with the tire beads pivoted outwardly to the side. However, this method has the drawback that when the tire beads are pivoted back into the operating position of the tire, stresses occur in the sidewalls and beads of the tire, with these stresses having a negative impact on the otherwise good properties of the tire.

An object of the present invention therefore is to provide a method of manufacturing the aforementioned type of pneumatic vehicle tire, whereby the tire can already be vulcanized with the proper configuration for its operating position.

BRIEF DESCRIPTION OF THE DRAWINGS

This object, and other objects and advantages of the present invention, will appear more clearly from the following specification in conjunction with the accompanying schematic drawings, in which.

SUMMARY OF THE INVENTION

Figure 1:
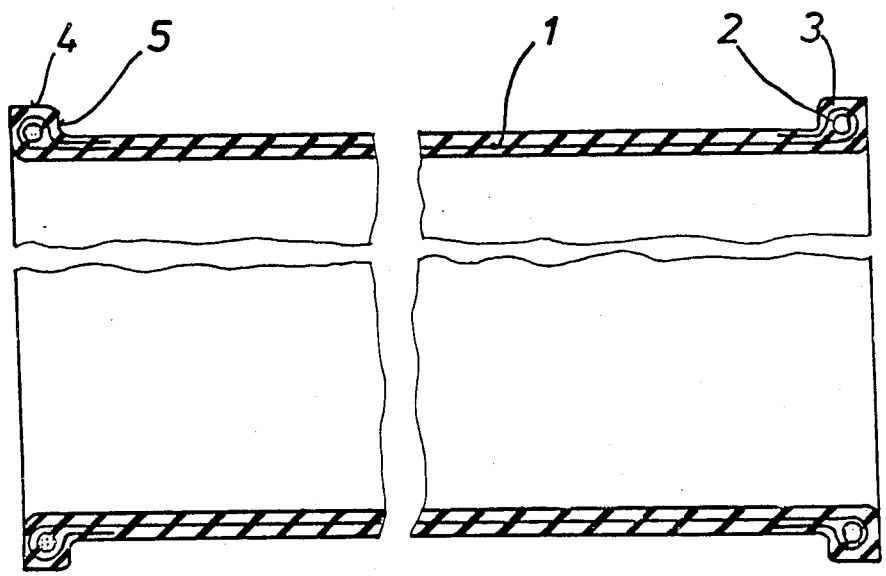
FIG. 1 is a view that shows a partial radial section through a tire blank as it has been built-up on a drum.

The inventive method of producing a pneumatic vehicle tire, the beads of which can be mounted on the radially inner periphery of a rim, and are pivotable relative to the bead cores, includes the steps of: combining, on a drum, a carcass, along with the adjacent rubber layers, and the tire beads with their pull and compression resistant cores, to form an essentially cylindrical blank, whereby what will later be the insides of the tire initially face radially outwardly, and whereby the interfaces of the initially radially outwardly extending beads form an essentially right angle with the cylindrical surface of the blank; preliminarily vulcanizing at least the bead regions of said tire blank; turning said blank in; imparting a toroidal shape to said turned-in blank; providing said toroidal-shaped blank with a tread strip; and final-vulcanizing said blank.

One preferred method of the present invention is characterized in that the blank, along with the carcass and the tire beads, is provided with a cross-sectional shape where the contour of the tire beads and the greatest portion of the sidewalls already correspond to the contour of the finished tire, and where the carcass extends in the neutral zone. The blank is preliminarily vulcanized in this shape, and is thereupon turned in, completed, and final-vulcanized. This method assures a stress-relief of the carcass in the operating position of the tire, because the carcass is disposed in the region of the neutral zone in the blank.

The significant advantage of the present invention is that, due to the preshaping of the bead and lower sidewall regions of the tire blank, and due to the stabilization of this shape via a preliminary vulcanization, the tire can be final-vulcanized in its final contour in a conventional vulcanizing mold. The preshaping of the aforementioned regions is particularly simple because during the build-up of the tire blank on the drum, what will later be the interior of the tire is disposed radially outwardly, so that the regions that are to be shaped are easily accessible, and can be worked upon with conventional rollers and shaping apparatus. The preliminary vulcanization of the bead regions can be carried out either on the drum, or in a vulcanizing apparatus located at any other convenient location. Subsequent to the preliminary vulcanization of the tire beads, the tire blank is turned in, so that the inner surface, which previously faced radially outwardly, now faces radially inwardly, and application of a tread strip and dishing or curving of the tire can be effected.

Further advantageous features of the present invention will be described in detail subsequently.

DESCRIPTION OF PREFERRED EMBODIMENTS

Referring now to the drawings in detail, to begin with the manufacture of a tire is effected by building up a tire blank on a drum. The tire blank comprises the carcass 1, pull and compression resistant bead cores 2, and the rubber of the beads 3, and possibly already the rubber of the inner surface. The individual components of the blank are assembled on the drum in such a way that what will later be the interior of the tire is initially disposed radially outwardly. It is expedient to give the tire blank already on the drum, its final form in the region of the tire beads 3, so that the otherwise cylindrical blank has the later seating surfaces 4 and the nearly perpendicular interfaces or delimiting surfaces 5 of the tire beads 3 projecting radially outwardly This profiling or shaping can be produced with known roller devices as well as other shaping means that can be provided from the outside.

Figure 2:
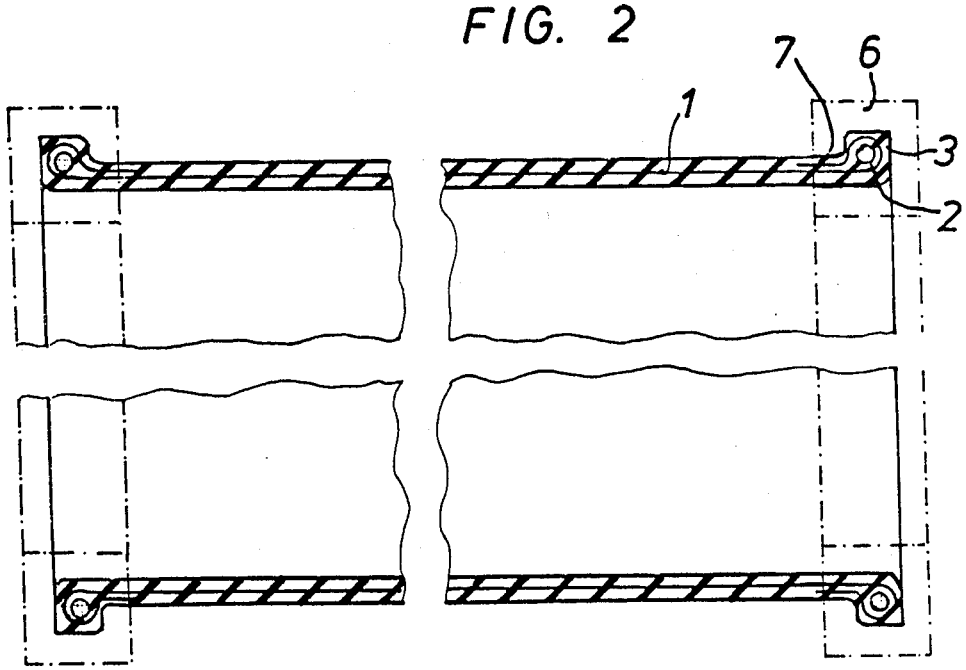
FIG. 2 is a view that shows a partial radial section of the tire blank of FIG. 1 with a diagrammatically indicated vulcanizing apparatus for the tire beads.

After the tire blank is built up in an essentially cylindrical shape, it is preliminarily vulcanized in the region of the tire beads 3, as indicated for each tire bead 3 in FIG. 2 via a dot-dashed vulcanizing apparatus 6. The preliminary vulcanization of the tire blank can fundamentally be effected on the drum or at any other location. The main purpose of the preliminary vulcanization is to impart the final shape, with its extremely smooth surface, to the blank in the region of the seating surfaces 4, the interfaces 5, and the adjacent parts 7 of the sidewalls, so that during the further production of the tire, the shape of these regions can no longer be altered.

It should be noted that the tire beads 3 must have a pivotable construction. What this means is that the tire beads 3 can rotate or pivot about an axis that extends in the circumferential direction of the tire. On the one hand, this pivoting of the bead 3 can be effected about an axis that extends through the cross-sectional centerpoint of the bead core in such a way that the bead 3 can twist by sections about a certain angle that is a function of the properties of the material and the construction of the bead core 2 and the remainder of the bead 3. On the other hand, the pivotal movement of the bead 3 about the bead core 2 can be achieved by embedding the bead core 2 in the bead 3 in a non-adhesive manner, for example by wrapping it with a fabric strip that, possibly after appropriate pretreatment, prevents adhesion thereof to the adjacent material. Finally, the relative movement during pivoting of the bead 3 can also be effected between individual layers of the core.

After the preliminary vulcanization of the tire beads 3, the cylindrical tire blank is turned in, so that the outer wall faces inwardly. The rubber layer intended for the inner surface is expediently applied simultaneously with the manufacture of the blank; however, if necessary, this rubber layer can also be applied after the blank is turned in. Subsequently, the tire blank is given a toroidal shape in a customary manner by being curved or dished into a tread strip 8 supplied thereto; if desired, the still-missing sidewall strips 9 can be applied. The tire blank thereupon already has the final contour with the previously shaped surfaces 4, 5, and 7 in the interior of the tire. With this contour, which corresponds to the operating position of the finished tire, the tire blank is final-vulcanized in a conventional vulcanizing mold. The final vulcanization can be effected with or without a conventional heating bellows. In so doing, it is advantageous to impart to the bellows such a shape that the latter fills the interior to the side of the tire beads 3. This can be effected by adding airbags. However, no rigid metallic shaping rings are required at these locations.

Figure 4:
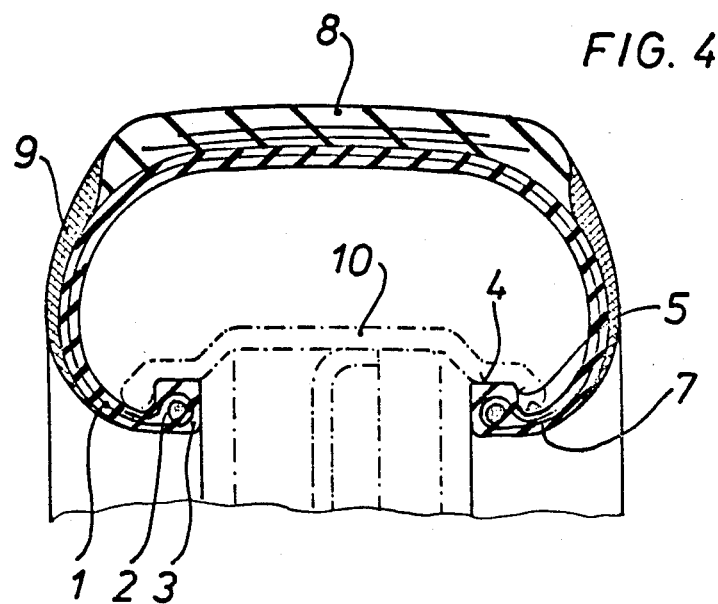
FIG. 4 is a view that shows a partial radial section of a finished tire in its operating position on a rim that is indicated by dot-dashed lines

FIG. 4 shows the final-vulcanized tire on a rim 10, which is indicated by dot-dashed lines. The tire is essentially in a stress-relieved state on the rim 10, because it was final-vulcanized with that same cross-sectional shape. An airtight seating of the tire on the rim 10 is assured because, already during the preliminary vulcanization, a smooth surface was imparted to the faces 4, 5, 7 that are critical for such an airtight seating.

Figure 3:
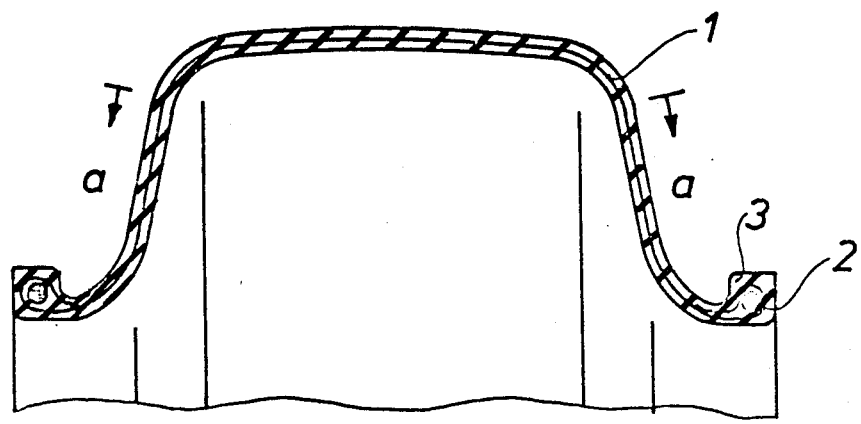
FIG. 3 is a view that shows a partial radial section of the tire blank of FIG. 1, but having a cross-sectional shape where the tire beads and the sidewalls already have the contour of the finished tire.

FIG. 3 shows a somewhat modified variation of the tire manufacture. After the blank of FIG. 1 has been built up, it is converted, by being inflated or by the generation of an external vacuum, from its cylindrical shape into the arched cross-sectional shape of FIG. 3. In doing so, one must pay attention that in the region of the beads 3 and the sidewall sections "a", the blank is already given the final desired cross-sectional contour of the tire.

In this position, the blank is preliminarily vulcanized. It is subsequently turned in. Since the carcass 1 is disposed in the neutral zone of the blank wall, no stresses are present after the turning in. The further completion of the tire blank, and the final vulcanization, are effected in the manner previously described, thus assuring that the complete tire blank is final-vulcanized in the operating position of the tire, and that the tire can be mounted onto a rim 10 in a stress-relieved state.

The present invention is, of course, in no way restricted to the specific disclosure of the specification and drawings, but also encompasses any modifications within the scope of the appended claims.

What we claim is:

1. A method of producing a pneumatic vehicle tire having heads including bead regions and bead cores which are pull and compression resistant, which can be mounted on a radially inner periphery of a rim, and which are pivotable relative to the bead cores; said method comprising the steps of:

combining, on a drum, a carcass, along with the adjacent rubber layers, and the tire beads, along with their pull and compression resistant cores, to form an essentially cylindrical tire blank in a configuration, whereby what will later be the insides of the tire at this stage face radially outwardly, and whereby the interfaces of the tire beads at this stage extend radially outwardly and form an essentially right angle with the cylindrical surface of the blank;

preliminary vulcanizing at least the bead regions of said tire blank while in said configuration;

turning said blank in;

imparting a toroidal shape to said turned-in blank;

providing said toroidal-shaped blank with a tread strip; and final-vulcanizing said blank.

2. A method according to claim 1, which includes the step of carrying out said preliminary vulcanization on said drum.

3. A method according to claim 1, which includes the step of applying the rubber layer comprising the inner surface to said blank prior to said turning in step.

4. A method according to claim 1, which includes the step of applying the rubber layer comprising the inner surface to said blank subsequent to said turning in step.

5. A method according to claim 1, which includes the step, after said combining step and prior to said preliminarily vulcanizing step, of imparting to said blank a cross-sectional shape where the contour of said tire beads and the greatest portion of said sidewalls already corresponds to the contour of the finished tire, and where the carcass extends in the neutral zone.

6. A method according to claim 5, in which said preliminary vulcanization is carried out in a mold without a heating bellows.

* * * * *